INVENTORS
Ross S. Phillips and
BY Ray G. Carlin

Fay Oberlin & Fay
ATTORNEYS.

INVENTORS
Ross S. Phillips and
BY Ray G. Carlin

Fay, Oberlin & Fay
ATTORNEYS.

Feb. 12, 1935.  R. S. PHILLIPS ET AL  1,990,749
APPARATUS FOR COATING, IMPREGNATING, LAMINATING, AND THE LIKE
Filed Feb. 1, 1932  6 Sheets-Sheet 5

INVENTORS
Ross S. Phillips and
Ray G. Carlin.
BY
Fay, Oberlin & Fay
ATTORNEYS

Patented Feb. 12, 1935

1,990,749

UNITED STATES PATENT OFFICE 1,990,749

APPARATUS FOR COATING, IMPREGNATING, LAMINATING, AND THE LIKE

Ross S. Phillips, Cleveland, and Ray G. Carlin, Shaker Heights, Ohio, assignors to The Cleveland Liner and Manufacturing Company, Cleveland, Ohio Application February 1, 1932, Serial No. 590,072

22 Claims. (Cl. 91—53)

This invention relates as indicated to a method of and apparatus for coating, impregnating, laminating and the like and has specific reference to methods of and apparatus for treating material, preferably in sheet form, whereby the same may be suitably coated and/or impregnated and in some instances, combined with another element of material to form a composite or laminated structure.

In treating material for the purpose of impregnating, coating or laminating the same, it is essential that the amount of treating material be not only uniformly and evenly distributed but also the amount of material applied, i. e., the thickness of the layer, must be capable of being controlled within very narrow limits.

In applying a relatively thin coating of flowable material to a sheet or web and the like by means of a doctor blade, if the thickness of such coating is to be maintained substantially uniform, it is essential that the doctor and the backing member which presents the material to be coated or treated to the doctor, be maintained in a fixed relationship. However, some provision must be made for relief of one or the other of such elements when foreign material, a lap or splice in the material being treated or the like passes through the space between the backing member and the doctor, so that the material which is usually of low tensile strength will not be torn or damaged by the occurrence of such obstructions. Furthermore, some means must be provided so that if a grain of foreign or solid material finds its way against the forward face of the doctor blade, the space between the blade and material may be momentarily relieved to permit the passage of such grain so that a longitudinal streak will not be formed on the material being coated.

When material in sheet or web form is passed between a doctor and suitable backing member for the purpose of coating, impregnating or similarly treating the same, it is essential for uniformity in results that such sheet or web be smoothed free from all wrinkles before passing to the treating zone.

When two or more sheets or webs and the like are put together to form a composite or laminated structure, it is essential that the inclusion of air pockets and the like be entirely eliminated in addition to the fact that sufficient pressure must be brought to bear to force the elements together so that the adhesive coating which, incidentally, may have other properties is enabled to permanently secure together the several layers. After the material has been treated and/or laminated in the manner above described, it is essential that a suitable off-bearing means be provided which will carry the material away from the treating apparatus at exactly the same speed at which the finished product is available.

It is among the objects of our invention to provide methods of and apparatus for treating, impregnating, coating, laminating and the like which shall have all of the above named desirable characteristics.

Other objects of our invention will appear as the description proceeds.

To the accomplishment of the foregoing and related ends, said invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

Referring now more specifically to the drawings and more especially to Figs. 1 to 4, the apparatus comprising our invention consists generally of side frame members 1 and 2, respectively, forming what will hereinafter be referred to, for convenience, as the left and right-hand sides of the machine. These side frame members serve the usual function of such members in machinery construction in that they serve as the supporting means for the apparatus hereinafter more fully described. A suitable bed-plate and cross-braced members may be employed in association with such side frame members for the purpose of producing a rigid unitary structure.

*The material applying mechanism*

Figures 6, 8:
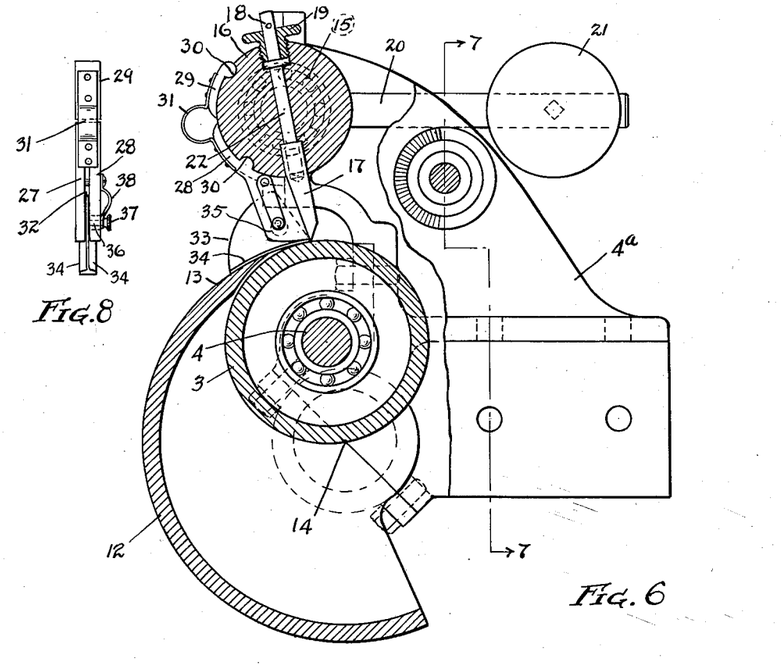
Fig. 6 is an enlarged fragmentary, part sectional, part side elevational view of the doctor blade and associated mechanism forming a part of the construction illustrated in the previous figures.
Fig. 8 is a front elevational view of the guide members illustrated in Figs. 3 and 6.
Figure 7:
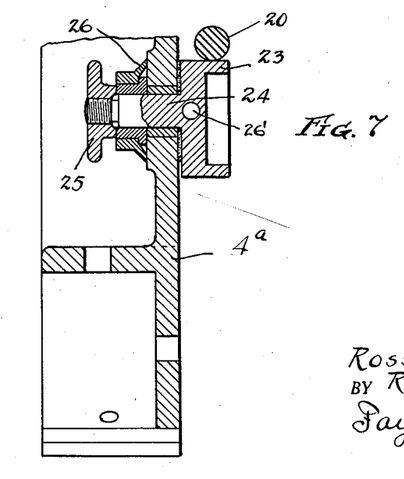
Fig. 7 is a fragmentary, transverse sectional view of the apparatus illustrated in Fig. 6 taken on a plane substantially indicated by the lines 7—7.

The mechanism for applying the flowable composition to the material being treated will now be described in detail by having reference more specifically to Figures 6, 7 and 8 and such other figures in which parts of this apparatus are incidently illustrated. The material being treated passes over a backing roll 3, which is preferably formed of a suitable metal and ground to a true cylindrical form. The roll 3 is freely rotatably supported on a shaft 4 which is terminally secured at opposite ends in brackets 4a adapted to be secured to the opposite side frame members 1 and 2.

Figure 9:
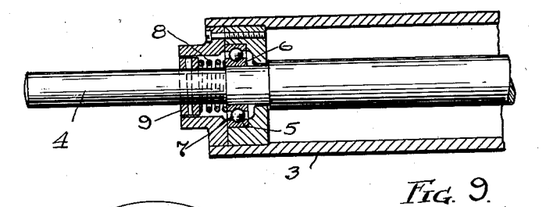
Figs. 9 and 10 are respectively, fragmentary sectional views of the opposite ends of the backing roll and its associated supporting means.
Figure 10:
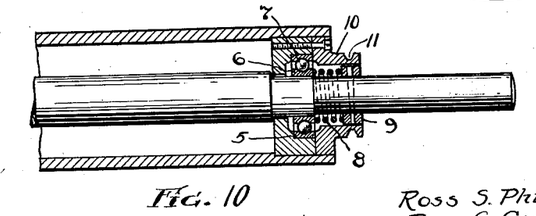

As most clearly illustrated in Figs. 9 and 10, the roll 3 is rotatably supported on the shaft 4 by means of friction reducing bearings consisting of outer races 5 and inner races 6 respectively mounted on the roll 3 and shaft 4 and intermediately of which are bearing members 7 in the figures illustrated as balls but it is to be understood that rollers or the like may be employed without departing from the principles of our invention.

The apparatus comprising our invention is designed for accuracies which do not permit any looseness in the support for the backing roller 3. If any looseness were to be present, it would be impossible to accurately control the space between such backing roller and the doctor blade presented in operable relation thereto. For the purpose of eliminating such possible looseness in the bearing support for the roller 3 on the shaft 4, we have provided a compression spring 8 which, at the outer end, seats against a collar 9, preferably keyed to the shaft 4 and, at its inner end, seats against the inner ball race 6, thereby urging the same axially relatively to the outer ball race 5, thereby automatically compensating for all looseness or wear which may be present in these parts.

In order to facilitate the lapping-in operation between the doctor blade and the backing roller 3, and for other purposes presently to be explained, we provide at least one end of the roller 3 with an annular extension 10 having a belt groove 11 formed therein so that the roller may be positively driven on the shaft 4 by training a belt around the groove 11 and a suitable source of power.

Rotatably supported adjacent the backing roller 3 is a material guiding apron 12. Its upper edge 13 is relieved sufficiently so as to be capable of being moved into closely over-lying relationship with the periphery of the backing roll 3. The apron 12 may be provided with suitable means not shown, such as a handle rotating the same about the axis 14 away from the backing roll 3 to facilitate a cleaning of the apparatus after use and for other adjustments and possible replacement of parts.

The brackets 4a likewise serve as a means of support on suitable friction reducing bearings 15 of a rotatable doctor blade supporting member, generally indicated at 16. The doctor blade 17 is supported for transverse adjustment in the rotatable member 16 by means of studs 18 and lock nuts 19. It is to be noted that the lower side of the member 16 is provided with an axially extending groove receiving the back edge of the doctor blade 17, and spaced transversely extending apertures communicating with such groove receive the studs 18 which adjustably support the blade in such groove. Secured to the rotatable member 16 is a radially extending arm 20 which carries a counterweight 21 so arranged as to urge the member 16 and its associated doctor blade 17 in a clockwise direction, as viewed in Fig. 6, which is counter to the direction of normal movement of the material being treated across the backing member 3. Suitable means will preferably be provided for supporting the counterweight 21 at spaced points on the arm 20 at different distances from the axis 22 of the rotatable member 16 so as to vary the force by which the doctor blade 17 is urged in a direction counter to the movement of the material. The radial arm 20 rests on an adjustable stop 23 which may be in the form of an eccentric secured to a stub shaft 24 journaled in a portion of the bracket 4a and terminally provided with a lock nut 25 and an indicating dial 26. Rotation of the shaft 24 may be effected by inserting a pin in the aperture 26' and then rotating such shaft, which will, accordingly, vary the clockwise movement of the doctor blade 17 and accordingly, the space between the operating edge of such blade and the periphery of the backing roll 3. The lock nut 25 maintains the parts in proper adjusted relation against accidental displacement.

As the material is passed through the space between the edge of the doctor blade and the backing roll 3, the flowable treating composition will be impounded against the forward face of the doctor blade. Some means must, therefore, be provided for laterally impounding such treating material. Such laterally impounding means which likewise determines the width of the area on the material which will be subjected to the treating composition, comprise bracket members, generally indicated at 27, which include adjacent curved members 28 and 29, each provided with curved inner faces and transverse arcuate projections adapted to engage in spaced longitudinal grooves 30 formed on the periphery of the rotatable member 16. These projections are maintained in the grooves and the assembly accordingly adjustably secured to the rotatable member 16 by means of spring members 31. The lower portion 28 of each guide is bifurcated, as at 32, to receive and laterally support the web 33 of the guard member. The web 33 of the guard is provided with curved laterally extending flanges 34 adapted to engage and ride on the material being treated. The web 33 of the guides is provided with an enlarged aperture 35 into which projects the terminal 36 of a securing pin 37 normally maintained in position by a spring 38.

The guide members just described are effective to laterally confine the impounded flowable material so that the edge of the treated area on the material is not only well defined but the material, in passing over the backing roll 3 and under the doctor blade 17, is not interfered with by the presence of such guides.

The sheet or web pulling mechanism

The apparatus illustrated in the drawings for purposes of convenience is of the type designed to operate upon a continuous web or sheet drawn from a supply roll or reel. The apparatus for pulling such web or sheet through the treating and/or laminating mechanism consists of a suction roller, generally indicated at 39, which, although forming no part of this invention, may be described as comprising the usual ingress orifices formed in the periphery and communicating with axially extending circumferentially adjacent cavities within the roller, which, through suitable means such as a collecting ring, will be in communication with a conduit 40 employed to exhaust the air in those cavities of the suction roller 39 which are in operable engagement with the web or sheet passing through the apparatus.

Figure 4:
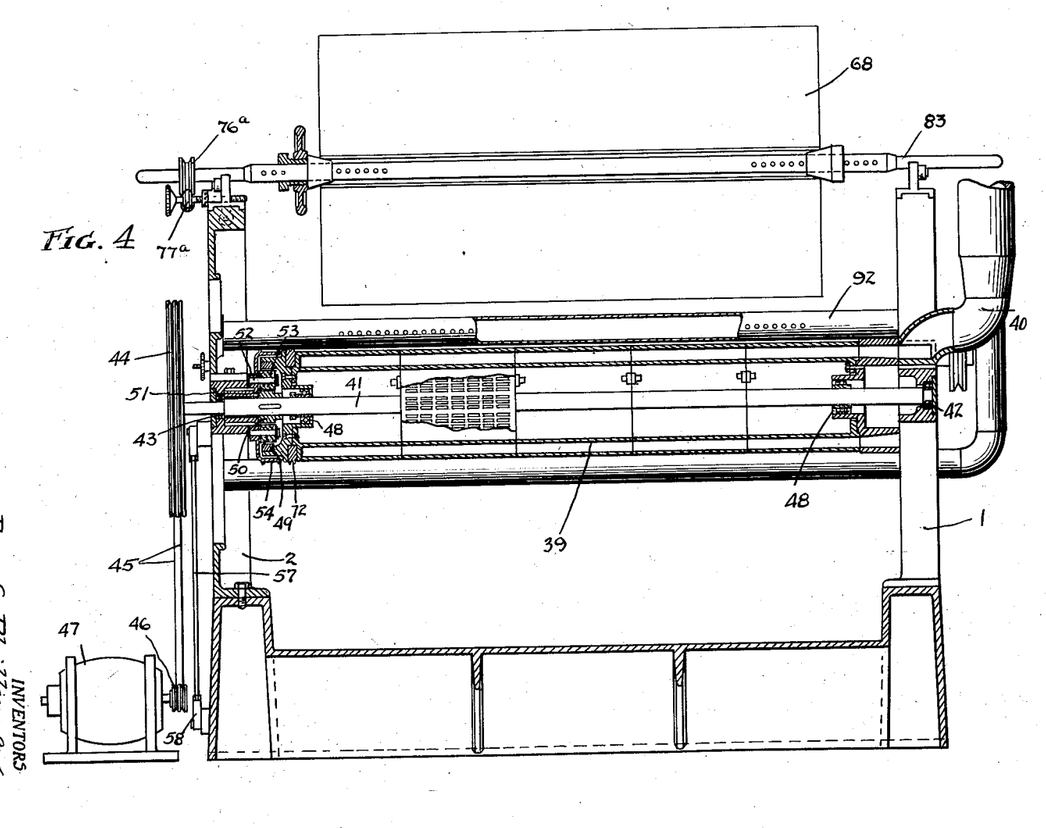
Fig. 4 is a rear elevational view, partially in section, of such apparatus.

As most clearly illustrated in Fig. 4, the suction roller 39 is preferably formed of a plurality of axially adjacent sections which not only simplifies the manufacture of such roller but also makes possible the use of such roller in machines of different width. Coaxial with the suction roller 39 is a drive shaft, generally indicated at 41, which is journaled in suitable bearings 42 and 43 in the side frame members 1 and 2. The shaft 41 has terminally keyed thereto the sheave 44 about which may be trained belts 45, which pass around the driving sheave 46 of a suitable motor 47. The motor 47 will preferably be mounted on a foundation independent of the base and substructure of the apparatus, so that no vibration will be transmitted from the motor to such apparatus. This vibration may likewise be reduced to a minimum by the employment of flexible belts such as 45 instead of a direct train of gears or a metallic chain. The suction roller 39 is rotatably supported on the drive shaft 41 by means of bearings 48. The roller 39 is, at one end, provided with an annular extension carrying an orbit gear 49. Keyed to the shaft 41 is a sun gear 50. Rotatably supported on the shaft 41 is a spider 51, which carries a plurality of circumferentially spaced stub shafts 52 which rotatably support planet gears 53 meshing with both the sun gear 50 and the orbit gear 49. The spider 51 is terminally flared into an annular extension 54 adapted to be engaged by a brake-band 55, as most clearly illustrated in Fig. 5. The usual type of linkage, generally indicated at 56, is employed for the purpose of effecting a contraction of the brake-band 55 and a consequent gripping of the flange 54 upon a suitable action of a lever 57.

Figure 2:
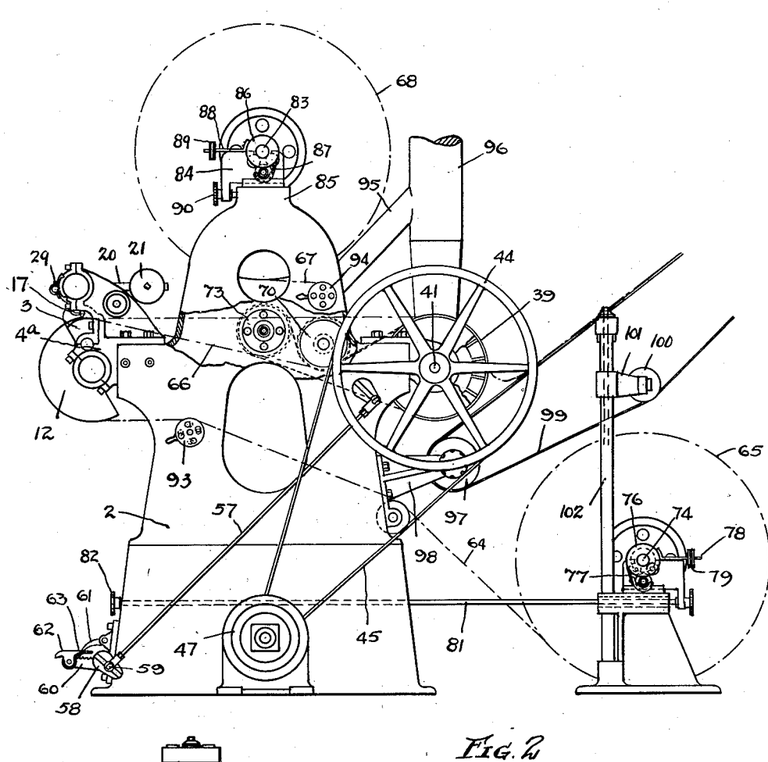
Fig. 2 is an elevational view, partially in section of the right side of the apparatus comprising our invention.
Figure 3:
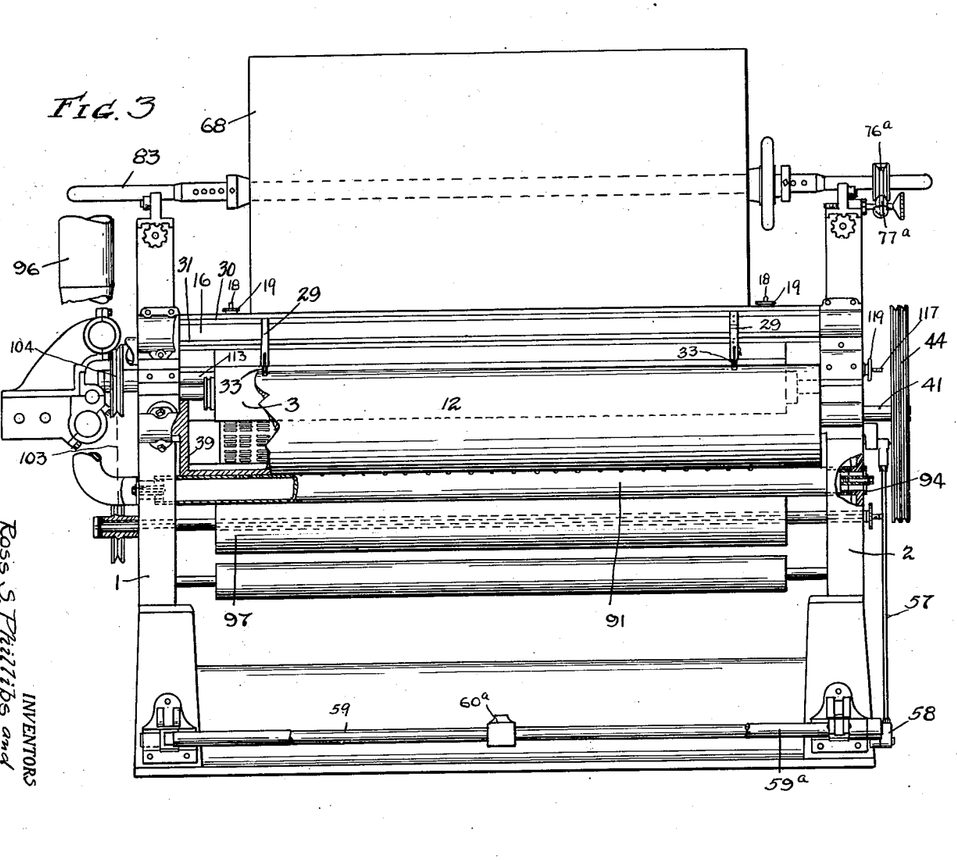
Fig. 3 is a front view, partially in section, of the apparatus illustrated in the previous figures.

The lever 57, as most clearly illustrated in Fig. 2, extends forwardly of the machine and is terminally secured to a bell crank 58 carried by the end of a shaft 59 extending across the front of the machine. As most clearly illustrated in Fig. 2, the shaft 59 has an actuating crank arm 60 secured thereto and extending radially therefrom, which, on its upper surface, is provided with suitable serrations adapted to be engaged by the pawl 61 carried by a portion of the frame of the machine. A step plate 62 is oscillatably secured to the end of the arm 60 and provided with a rearwardly extending projection 63 by which the pawl 61 may be lifted out of the notches on the arm 60. The parts 61, 62 and 63 are provided only on one side of the machine. A suitable actuating crank such as 60 will be provided on the side frame member 1 and an auxiliary safety stop in the form of a shaft 59a extends across the front of the machine so that the bell cranks 58 may be rotated to stop the machine by the operator simply stepping on the shaft 59a. The counterweight 60a is employed on the shaft 59 to normally urge the rod 57 in a direction tending to apply the brake 55.

The operator of the apparatus may, therefore, depress the lever 60 to any extent and such lever will then be maintained in such position by the pawl 61 until a counter-clockwise rotation of the step plate 62, as viewed in Fig. 2, lifts such pawl out of the notch and permits the rod 57 to return to the operative position. Axial movement of the rod 57 is, as above indicated, normally effected by means of the counterweight 60a to effect an application of the brake-band 55, which will arrest rotation of the spider 51 and effect a consequent rotation of the suction roller 39 through the planet gearing in the manner which is usual with such construction.

The laminating apparatus

When it is desired to apply one sheet to another for the purpose of producing a composite or laminated product, the web or sheet 64 drawn from a roll 65 is pulled through the apparatus along the path indicated more specifically at 66 and the sheet or web 67 drawn from a roll or coil 68, which is to be applied to the coated sheet, is drawn along the path generally indicated at 69.

At the point where the two sheets are brought together, is provided a laminating roller 70 positioned so as to force the two sheets together so that an adhesive coating or layer therebetween securely unites the two sheets.

For the purpose, as hereinafter more fully explained, of evenly and uniformly combining these sheets as they are brought together and further, to insure a more uniform bond between the sheets, the roller 70 will be driven at a surface speed somewhat less than the lineal velocity of the sheets of material being laminated. This differential between the surface speed of the laminating roller and the sheets passing thereunder has been found to be absolutely essential in order to secure the best results.

The roller 70 will preferably be driven in the manner above defined by means of a sprocket chain 71 passing around a sprocket 72 on one end of the suction roller 39, a similar sprocket on the end of the roller 70 and an idler sprocket 73.

The material supplying mechanism

Figure 1:
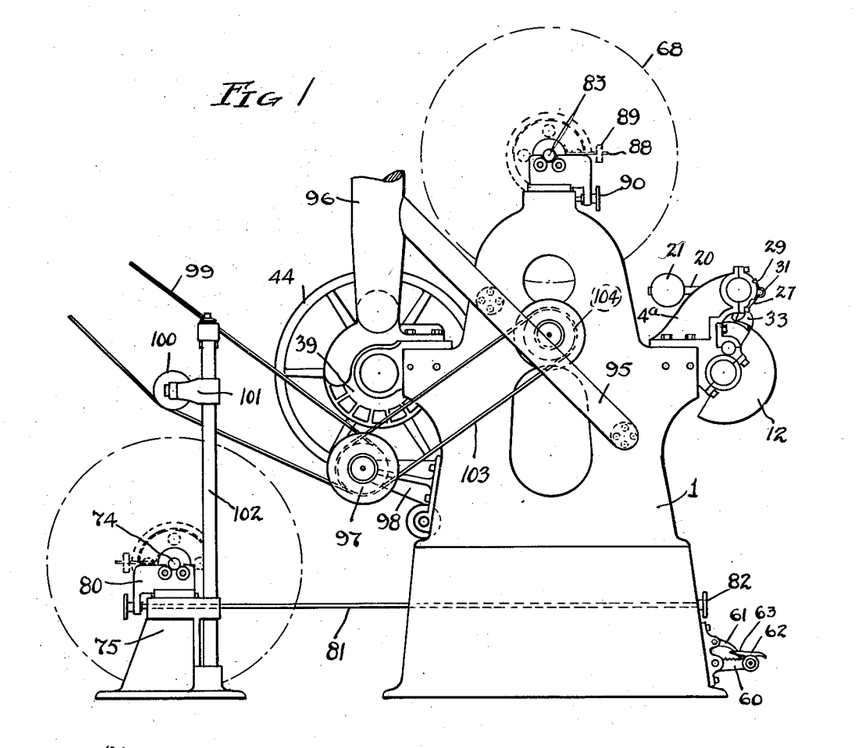
Fig. 1 is a side elevational view, hereinafter referred to as the left side of the apparatus comprising our invention.

The material to be coated or similarly treated, i. e., the sheet or web 64 is, as above indicated, drawn from a supply roll 65 which, as most clearly illustrated in Figs. 1 and 2, is rotatably supported on a shaft 74 terminally supported on standards 75 to the rear of the machine. The shaft 74 is, at one end, provided with a brake drum 76, which is at least partially encircled by a brake band 77, at its opposite end provided with an actuating lever 78. Weights such as washers 79 are placed on the arm 78 for the purpose of regulating the effectiveness of the brake 77. This brake is provided so that the roll 65 will not over-run as the web or sheet 64 is withdrawn therefrom.

Mounted on the abutments 75 are bearing blocks 80 which carry the means for supporting such shaft and the roll of material thereon. These blocks 80 are slidable on the abutments 75 and are adjustable transversely with respect thereto by means of rotatable shafts 81 which extend forwardly of the machine and are, at their forward ends, provided with hand-wheels 82. These shafts are designed for the purpose of adjusting the angular relation of axis of the shaft 74 with respect to the direction of movement of the sheet or web 64, so that the web will be fed in the proper manner to the treating apparatus.

As above indicated, the second sheet 67 is drawn from a roll 68 carried by a roller or shaft 83. The shaft 83 is rotatably supported on sliding blocks 84 mounted on the upper end 85 of the side frame members 1 and 2. The shaft 83 is terminally provided with a brake drum 86 which is engaged by a brake band 87 terminally provided with a brake arm 88. Adjustable weights, such as washers 89, are carried by the brake arm 88 for the purpose of varying the effectiveness of such brake, so that the roll 68 may be prevented from over-running as the sheet or web 67 is withdrawn therefrom. Adjusting screws, generally indicated at 90, are provided for moving the blocks 84 transversely of their supports to properly align the roll 68 so that the web 67 will be properly fed to the apparatus.

Figure 11:
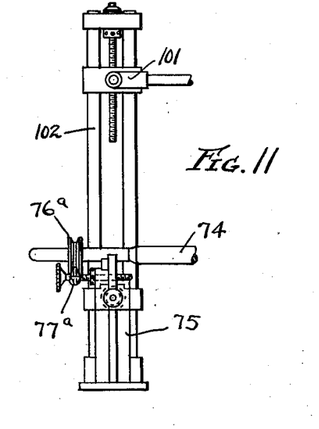
Fig. 11 is a rear elevational view of one side of the means for supporting one of the rolls of material and the idler associated with the off-bearing web.

The two webs or sheets to be laminated are maintained in proper alignment relatively to each other and to the treating apparatus by relatively axially adjusting the same by some means such as is most clearly illustrated in Figs. 4 and 11. Such means comprises a sheave or bearing member 76a secured to the spindle of the roll of paper which is in engagement with axially adjustable rotatable rollers 77a. By a proper axial adjustment of the rollers 77a, the two webs can be fed to the apparatus so that their lateral edges will coincide while being laminated.

In order to provide even tension transversal of the sheets or webs and consequently, to prevent waves in the material approaching the treating and/or laminating apparatus, the sheets 64 and 67 are caused to pass over suction members 91 and 92, respectively. These suction members are in the form of hollow pipes with a plurality of axially spaced apertures formed in the sheet contacting portions of the wall so that the sheet is ironed out in its passage thereover. In order to vary the effectiveness of these suction members, they are terminally provided with valve members 93 and 94, which cooperate with ports formed in the ends of such suction members so that by opening such ports, the vacuum within the suction members may be relieved to any desired extent. The air is exhausted from these suction members by means of a conduit 95 which may be connected to the main conduit 96 employed for the purpose of exhausting the air within the suction feed roll 39. It should be noted, at this point, that instead of employing the relief valves 93 and 94, we may provide valves in the branches of the conduit 95 for regulating the amount of suction within the pipes 91 and 92.

The off-bearing mechanism

It is essential that the treated sheet or web be carried away by some means at exactly the same speed at which such sheet or web passes through the treating apparatus. To this end, we have provided a roller 97 rotatably supported on brackets 98 secured to the rear faces of the side frame members 1 and 2. This roller has trained thereabout a suitable conveying belt or web 99 which also passes about an idler roller, not shown, at the discharge end. In order to maintain the proper tension on the web 99, an idler roller 100 is provided which is carried by suitable arms 101 vertically adjustably supported on standards 102, which, at their lower ends, may be mounted on or adjacent the abutments 75.

The roller 97 is driven by means of a belt 103 which is trained about a sheave 104. The sheave 104 is driven from the sprocket 73 by the apparatus, the construction of which is most clearly illustrated in Fig. 12. As illustrated in this figure, the sprocket 73 is secured to a sleeve 110 which, at one end, is journaled in the side frame member 2 and, at its other end, is secured to an extended hub 111 of a sheave 112. In axial alignment with the sleeve 110 is a sleeve 113 to which the hub 111 is likewise secured, as well as the hub 114 of the other half of the sheave 112.

Figure 12:
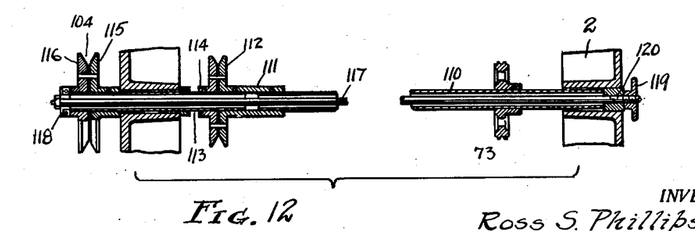
Fig. 12 is a broken fragmentary, transverse sectional view showing the construction of the speed changing apparatus comprising one of the drives in the mechanism illustrated in the previous figures.

At this point it should be noted that the sheave 112 consists of two sections which are in driving communication with each other by means of pins passing therethrough. The sleeve 113 has fixedly secured thereto one of the separable sections 115 of the sheave 104. The other section 116 of the sheave 104 is slidable axially on the sleeve 113 but is forced to rotate with the section 115 by means of pins passing through such sections.

The belt 103 which is trained about the sheave 104 and which is employed for the purpose of driving the roller 97, is preferably of triangular cross section with the apex of such triangle engaged in the groove between the sections 115 and 116 of the sheave 104. Obviously the speed of the roller 97 may be varied within certain limits with respect to the speed of rotation of the sprocket 73 by separating the sections 115 and 116 of the sheave 104 to vary the effective radius of such sheave as the belt 103 passes therearound.

Similar means such as is illustrated in Fig. 12 will be employed in association with the sheave associated with the roller 97. In order to maintain proper tension on the belt 103 the effective diameter of the sheave associated with the roller 97 will be increased as the effective diameter of the sheave 104 is decreased and vice versa.

Relative axial adjustment between the sections 115 and 116 of the sheave 104 may be had by an axial adjustment of a rod 117 which is preferably coaxial with the sleeves 110 and 113 and at its left end carries a thrust bearing 118. The axial movement of the shaft 117 towards the left is restrained by means of a nut 119 threadably engaged on the right-hand end of this rod. The rod 117 is slidably engaged by means of a supporting block 120 carried by the side frame member 2 of the machine.

As will be apparent from the above description, an adjustment of the nut 119 will effect a variation in the space between the sections of the sheave 104 and accordingly, very fine adjustments may be had in the relative rotation of the roller 97 with respect to the sprocket 73.

These adjusting means for varying the surface speed of the off-bearing web or belt 99 with respect to the suction roller 39 is necessary to compensate for slippage between such suction roller and the web pulled thereby, so that the off-bearing apparatus will carry the finished product away from the apparatus at exactly the same speed at which such web is pulled by the suction roller 39.

The sheave 112 is provided to drive a belt which may be trained about the sheave 11 of the roller 3 so that this roller may be driven during the lapping-in operation and also when the sheet or web is coated or treated by having the same pass under instead of over such roller.

The sections of the sheave 112 may be adjusted axially relatively to each other by having threaded bolts extending therethrough or such bolts may be threaded in one sheave section and rotatable in the other. This adjustment is for the purpose of varying the effective diameter of this sheave and accordingly the speed of the roller driven thereby.

The axial separation of the sleeves 110 and 113 makes possible the application of an endless belt or chain to the sheave 112 and the sprocket 73 by simply axially retracting the rod or shaft 117.

The operation of the apparatus

When the apparatus is to be employed for the purpose of treating or coating a sheet or web of material, such material will preferably be drawn from the roll 65 and passed over the backing roller 3 under the doctor blade 17. The doctor blade 17 may be properly adjusted relatively to the periphery of the roller 3 by first adjusting the studs 18 and then locking the same by means of the nuts 19. The movement of such studs will effect a coarse adjustment of the blade with respect to the roller. This coarse adjustment should not be changed after the roller and blade have been lapped in but fine adjustments should be secured by the means presently to be described. Fine adjustments, however, may best be secured by a rotation of the eccentric member 23, as above indicated, which will limit the clockwise movement of the doctor blade and accordingly vary within fine limits the space between the edge of the blade and the roller. The material to be applied to the surface of the sheet 64 will be impounded against the front of the blade 17. If a splice in the sheet 64 occurs or if foreign material should find its way into the space between the blade and the material passing thereunder, the counterweight 21 will either be thereby lifted to relieve the space between the blade and the material to permit such obstruction to pass or the counterweight may be manually lifted in order to clear the blade of obstruction so that a uniform layer of material will be applied to the web. If only a coating is to be applied to the web 64 without combining another sheet therewith, then such web will take the path indicated by the line 104, that is, the sheet will be passed over the laminating roller 70 directly onto the suction roller 39 and onto the off-bearing web or belt 99. The provision of the epicyclical gearing drive for the suction roller 39, which is energized by an application of the friction brake 55, enables the suction roller to gradually exert a pull on the sheet so that all possibility of tearing the sheet will be eliminated. Likewise by a slippage of the brake 55 for any amount, the speed at which the suction roller 39 will be driven may be accordingly varied independently of the speed of the driving motor 47. This brake, therefore, enables the apparatus to be driven at speeds which might not be secured by an adjustment of the excitation of the motor 47.

Figure 5:
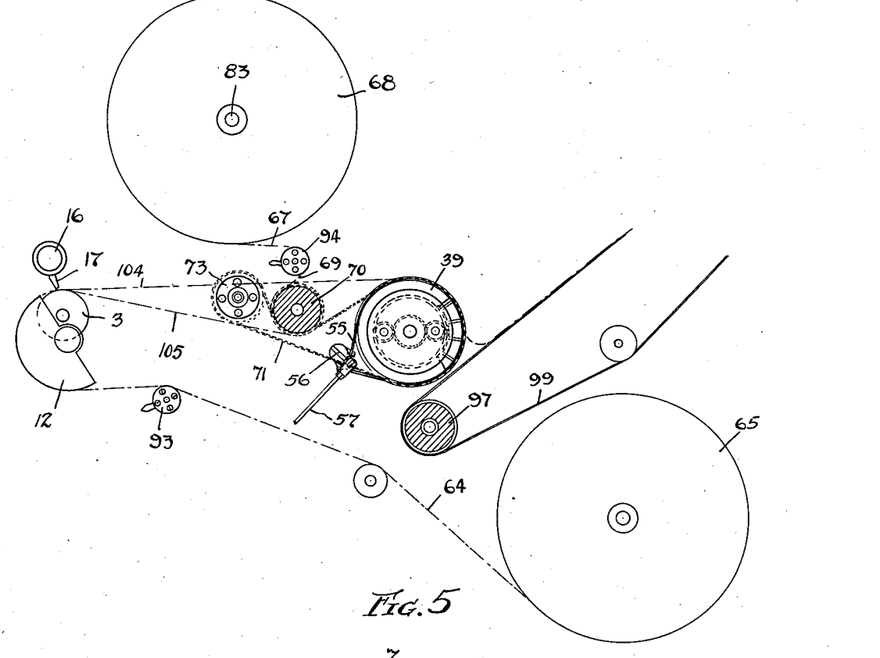
Fig. 5 is a diagrammatic side elevational view of the principal features of the construction illustrated in the previous figures.

It is to be noted that a coating may be applied to the sheet 64 by moving the guard 12 away from the roller 3 sufficiently so that the sheet or web may pass under the roller 3 instead of over the same, as is illustrated in Fig. 5. When the web or sheet passes under the roller 3, then the doctor blade 17 will be adjusted so that a layer of predetermined thickness will be deposited on the roller as the same moves in a clockwise direction. If the apparatus is employed in this manner, the roller 3 will be driven by means of a suitable belt passed around the sheave 11 and preferably at a surface speed equal to or slightly in excess of the speed of the material in a counter-direction. The roller 3, in contact with the material to be coated passing thereunder, will, therefore, deposit on the material to be coated such flowable composition as has been evenly distributed on the roller by means of the doctor blade 17. When two sheets are to be laminated, then the coating will be applied to the sheet 64 in either manner, as above explained, and then such sheet will follow the line, generally indicated at 105, that is, under the laminating roller 70. The second sheet 67 to be combined with the sheet 64 will be, as above indicated, drawn from the supply roll 68. The sheet 67 will pass over the smoothing suction member 92 and be brought into contact with the sheet 64 in the area at which the laminating roller 70 engages such sheet. The laminating roller 70 will, as above indicated, be driven at a surface speed slightly less than the rate of movement of material effected by a rotation of the suction roller 39, which differential in surface speeds will aid materially in preventing the formation of wrinkles at the point of lamination and the action of the laminating roller as the sheets pass thereunder is effective to prevent the inclusion of air pockets between the two sheets as they are put together.

At this point, it is to be noted that the suction roller 39 engages the sheet 64 and not the sheet 67. For this reason, the possibility of creepage between the two sheets as they are laminated is greatly diminished. After the sheets have been laminated, they will pass over the suction roller 39 onto the off-bearing web or belt 99 and thence to the point of use or to the apparatus for drying and/or coiling the same for storage and/or shipment.

It is believed that the principles comprising our invention are capable of being understood by those familiar with the art without a further description of the method and apparatus above described.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:

1. In apparatus of the character described, the combination of a backing roll, a stop, a movably supported doctor blade arranged in spaced parallel relation to said roll and defining therewith a space greater than the thickness of the material being coated, and means urging said doctor against said stop in a direction counter to the movement of the material being coated.

2. In apparatus of the character described, the combination of a backing roll, a stop, a pivotally supported doctor blade arranged in spaced parallel relation to said roll and defining therewith a space greater than the thickness of the material being coated, and means urging said doctor blade against said stop in a direction counter to the movement of the material being coated.

3. In apparatus of the character described, the combination of a backing roll rotatably supported on a fixed axis, a movably supported doctor blade adjacent said roll arranged in spaced parallel relation to said roll and defining therewith a space greater than the thickness of the material being coated, a stop, and means urging said doctor against said stop in a direction counter to the movement of material over said roll.

4. In apparatus of the character described, the combination of a backing roll rotatably supported on a fixed axis, a rotatably supported doctor blade adjacent said roll arranged in spaced parallel relation to said roll and defining therewith a space greater than the thickness of the material being coated, a stop, and means urging said doctor against said stop in a direction counter to the rotation of said roll during the passage thereover of material to be coated.

5. In a coating apparatus wherein a flowable composition, impounded against a doctor blade, is applied to material passed under such blade, the combination of means for movably supporting such blade, a stop, and means urging such blade against said stop in a direction counter to the movement of such material.

6. In a coating apparatus, wherein an excess of flowable composition is impounded against a doctor blade by the passage thereunder of the material to be coated, the combination of a rotatably supported doctor blade, a stop, and means urging said blade against said stop in a direction counter to the movement of the material to be coated.

7. In apparatus of the character described, the combination of a backing roll, a stop, a movably supported doctor blade arranged in spaced parallel relation to said roll and defining therewith a space greater than the thickness of the material being coated, means urging said doctor against said stop in a direction counter to the movement of the material being coated, and with a force sufficient to overcome the effect of the movement of the material being coated.

8. In a coating apparatus wherein a flowable composition, impounded against a doctor blade, is applied to material passed under such blade, the combination of means for movably supporting such blade, a stop, means urging such blade against said stop in a direction counter to the movement of such material, and with a force sufficient to overcome the effect of the movement of such material.

9. In a coating apparatus, wherein an excess of flowable composition is impounded against a doctor blade by the passage thereunder of the material to be coated, the combination of a rotatably supported doctor blade, a stop, means urging said blade against said stop in a direction counter to the movement of the material to be coated, and with a force sufficient to overcome the effect of the movement of such material.

10. In apparatus of the character described, the combination of a backing roll, a stop, a movably supported doctor blade, means urging the operating edge of said doctor against said stop in a direction substantially parallel counter to the movement of the material being coated, and with a force sufficient to overcome the effect of the movement of the material being coated, but yieldable to permit obstructions to pass under said blade.

11. In a coating apparatus wherein a flowable composition, impounded against a doctor blade, is applied to material passed under such blade, the combination of means for movably supporting such blade, a stop, means urging such blade against said stop in a direction counter to the movement of such material, and with a force sufficient to overcome the effect of the movement of such material, but yieldable to permit obstructions to pass under said blade.

12. In a coating apparatus, wherein an excess of flowable composition is impounded against a doctor blade by the passage thereunder of the material to be coated, the combination of a rotatably supported doctor blade, a stop, means urging said blade against said stop in a direction counter to the movement of the material to be coated, and with a force sufficient to overcome the effect of the movement of such material, but yieldable to permit obstructions to pass under said blade.

13. In a coating apparatus, the combination of a backing member, a doctor blade adjacent thereto, rotatable means supporting said blade, a stop, and a counter weight urging said blade supporting means against said stop in a direction counter to the movement of material being coated.

14. In a coating apparatus, the combination of a backing member, a doctor blade, rotatable means supporting said blade, a stop, and means yieldably urging said blade supporting means against said stop in a direction counter to the movement of material past said blade.

15. In a coating apparatus, the combination of a backing member, a doctor blade, rotatable means supporting said blade, means for adjustably moving said blade relatively to said supporting means, an adjustable stop, and means for rotating said supporting means against said stop in a direction counter to the movement of the material being coated.

16. In a coating apparatus, the combination of a doctor blade, a backing member, means for drawing a web or sheet over said backing member, and means for smoothing such web or sheet before the same passes over said backing member, said means comprising an apron having a smooth curved surface extending in close proximity to said blade and over which said web or sheet is led and with which the same has contact over an appreciable area.

17. In a coating apparatus, the combination of a doctor blade, a backing member, means for drawing a web or sheet over said backing member, and means for smoothing such web or sheet before the same passes over said backing member, said means including a stationary suction member provided with a plurality of suction apertures arranged in spaced relation transversely of the web contacting portion thereof, said web contacting portion presenting a curved surface.

18. In a coating apparatus, the combination of a doctor blade, a backing member, means for drawing a web or sheet over said backing member, and means for smoothing such web or sheet before the same passes over said backing member, said means including a suction stationary member provided with a plurality of suction apertures arranged in spaced relation transversely of the web contacting portion thereof, and an arcuate web guiding shoe adjacent said backing member.

19. In a coating apparatus, the combination of a doctor blade, a backing member, means for drawing a web or sheet over said backing member, and means for smoothing such web or sheet before the same passes over said backing member, said means including a stationary suction member provided with a plurality of suction apertures arranged in spaced relation transversely of the web contacting portion thereof, said web contacting portion presenting a curved surface and means for varying the suction in said member.

20. In apparatus of the character wherein a flowable composition is impounded between a doctor blade and an article to be treated passing thereunder, means for laterally confining such flowable material comprising a vertically movable guide member laterally supported by means adjacent said doctor blade, floatingly supported on said article and against the forward face of said doctor blade.

21. In apparatus of the character wherein a flowable composition is impounded between a doctor blade and an article to be treated passing thereunder, means for laterally confining such flowable material comprising a vertically movable guide member laterally supported by means adjacent said doctor blade, and adapted to ride on the article to be treated in its passage thereunder.

22. In apparatus of the character wherein a flowable composition is impounded between a doctor blade and an article to be treated passing thereunder, means for laterally confining such flowable material comprising a laterally adjustable support member adjacent said doctor blade, and a guide member laterally supported by said adjustable member and free to move in a plane normal to and in line with the movement of the material being treated.

ROSS S. PHILLIPS.
RAY G. CARLIN.